(12) United States Patent
Sundareswaran et al.

(10) Patent No.: US 6,330,356 B1
(45) Date of Patent: Dec. 11, 2001

(54) DYNAMIC VISUAL REGISTRATION OF A 3-D OBJECT WITH A GRAPHICAL MODEL

(75) Inventors: Venkataraman Sundareswaran, Camarillo; Reinhold Werner Behringer, Thousand Oaks, both of CA (US)

(73) Assignee: Rockwell Science Center LLC, Thousand Oaks, CA (US)

( * ) Notice: Subject to any disclaimer, the term of this patent is extended or adjusted under 35 U.S.C. 154(b) by 0 days.

(21) Appl. No.: 09/407,928

(22) Filed: Sep. 29, 1999

(51) Int. Cl.$^7$ ............................................. G06K 9/00
(52) U.S. Cl. ..................................... 382/154; 345/648
(58) Field of Search ................................... 382/103, 154, 382/285, 291, 294, 295; 345/7–9, 112–114, 139, 418, 629, 630, 648, 649, 633, 634, 672, 757, 664; 356/12, 373, 374, 375

(56) References Cited

U.S. PATENT DOCUMENTS

| | | | |
|---|---|---|---|
| 5,412,569 | 5/1995 | Corby, Jr. et al. ..................... 701/2 |
| 5,446,834 | * 8/1995 | Deering ................................ 345/427 |
| 5,471,541 | * 11/1995 | Burtnyk et al. ...................... 382/153 |
| 5,531,227 | * 7/1996 | Schneider ............................. 600/425 |
| 5,585,813 | * 12/1996 | Howard ................................... 345/8 |
| 5,625,765 | * 4/1997 | Ellenby et al. ...................... 345/633 |
| 5,850,352 | * 12/1998 | Moezzi et al. ....................... 345/419 |
| 6,064,749 | * 5/2000 | Hirota et al. ........................ 382/103 |

FOREIGN PATENT DOCUMENTS

0462289A1  12/1990  (EP) .............................. G01B/11/00

OTHER PUBLICATIONS

Webster, Anthony, et al., "Augmented Reality in architectural construction, inspection, and renovation," in *Computing in Civil Engineering*, pp. 1–7 (1996).

Hoff, W.A., et al., "Computer Vision–based Registration Techniques for Augmented Reality," *Proc. of Intelligent Robots and Computer Vision XV*, vol. 2904, in Intelligent Systems and Advanced Manufacturing, SPIE, Boston, MA, pp1–10 (1996).

Koller, D. et al., "Real–time Vision Based Camera Tracking for Augmented Reality Applications," Proceedings of the ACM Symposium on Virtual Reality Software and Technology, pp. 87–94. (1997).

(List continued on next page.)

*Primary Examiner*—Samir Ahmed
(74) *Attorney, Agent, or Firm*—Koppel & Jacobs

(57) ABSTRACT

The invention displays computer graphics in combination with imagery of real objects, while maintaining apparent alignment notwithstanding any changes of viewpoint of an imaging device relative to the real object. A computer executed control loop recognizes features in the image and finds a corresponding position and orientation of a CAD model by projecting the CAD representation onto a "virtual camera" and "moving" the virtual camera to track the relative motion of the real imaging device, according to an efficient "visual servoing" algorithm. In an alternate embodiment of the invention, computing tasks are divided between an "image processing host" and one or more "display hosts" which communicate over a channel. Bandwidth is conserved by performing image registration locally at the display host(s) using the "visual servoing" algorithm.

12 Claims, 8 Drawing Sheets

Microfiche Appendix Included
(1 Microfiche, 64 Pages)

OTHER PUBLICATIONS

Neumann, Ulrich, et al., "A Self–Tracking Augmented Reality System", *Computer Science Department usc*, pp. 1–7.

Grimson, W. E. L, et al., "An Automatic Registration Method for Frameless Stereotaxy, Image Guided Surgery, and Enhanced Reality Visualization", *IEEE Transactions on Medical Imaging*, vol. 15, No. 2, pp. 1–15 (1996).

Kutulakos, Kiriakos, N., et al., :Affine Object Representations for Calibration–Free Augmented Reality, IEEE Vritual Reality Ann. Int. Symp. (1996), pp. 1–12.

Uenohara and Kanade, "Vision–Based Object Registration for Real–time Image Overlay," Proceedings 1[st]International Conference on Computer Vision, Virtual Reality and Robotics in Medicine, 1995.

Fischler, M.A. and Bolles, R.C., "Random Sample Consensus: A paradigm for model fitting with applications to image analysis and automated cartography," Graphics and Image Processing, 24(6), pp726–740 (1981).

* cited by examiner

DYNAMIC VISUAL REGISTRATION OF A 3-D OBJECT WITH A GRAPHICAL MODEL

This application includes a microfiche appendix containing a software source code listing of 1 sheet and 64 frames, incorporated herein by reference.

BACKGROUND OF THE INVENTION

1. Field of the Invention

The invention relates generally to human/computer visual interfacing and more particularly to a three-dimensional, visual human/computer interface for interactive "augmented reality" applications.

2. Description of the Related Art

"Augmented reality" (AR) refers to a human/computer interaction in which synthetic, computer generated elements are mixed or juxtaposed with real world elements in such a way that the synthetic elements appear to be part of the real world. For example, computer generated graphic elements can be displayed on a partially transparent/partially reflective helmet or visor viewer so that the human sees real objects (through the visor) which appear to be mixed with computer generated graphics (projected by reflection from the inside of the visor). Alternatively, video imagery of real objects can be combined with computer generated graphics and the combination displayed on a conventional or stereoscopic video monitor. Such AR techniques offer an extremely useful human computer interface in numerous applications. Invisible features of a real object can be displayed as wire-frame graphics to indicate the internal structure of the object. This technique is useful, for example, to guide a surgeon in performing an intricate procedure, or to guide a mechanic in repairing a complex device. Invisible topographical features can be displayed to guide a pilot or navigator through a complex three dimensional terrain. Imaginary or potential features can be three-dimensionally and interactively displayed to an architectural or landscape designer. Many other educational, commercial, and entertainment applications are possible.

A central problem in AR is to align graphical information with an image of a real object. This is sometimes referred to as a "registration" problem. For example, on a video display, computer generated graphics should ideally be positioned in apparent registration relative to a video image of the corresponding real object. On a see-through display, the computer graphics should be positioned so as to appear registered with the external object being viewed, thereby achieving the illusion of reality. In either case, to achieve registration, the position and orientation of the viewer relative to the object must be found. This position and orientation information allows a computer to correctly render the graphical overlay as seen from the perspective of the camera or viewer. If the graphical interface is to be useful, the registration between the real world object and the computer generated graphics must be dynamically updated at a rate sufficient to maintain registration despite expected movements of the object or the observer. For example, in one augmented reality application a mechanic wearing a helmet mounted camera and a see through visor display system simultaneously views an engine and computer graphics emphasizing and identifying features of the same engine. It is most effective if the computer graphics are accurately registered with the real engine notwithstanding routine motions and changes of viewpoint of the mechanic. The moving mechanic will perceive a subjective sense of the display's reality only if the registration is dynamically accurate and responsive.

Two general approaches to the registration problem for AR have been attempted: (1) object pose estimation methods, and (2) observer pose estimation methods. In the former, the approach is to determine the position and pose of the object using either passive or active methods. Once this information is available, computer graphics are rendered to concur with the known position and pose of the object. In the latter approach, instead of determining the position and orientation of the object, the position and orientation of the observer or camera is determined. The computer graphics are then transformed to appear registered with the object given the determined position and orientation of the observer.

Object Pose Estimation Methods

The wearable computing project at Massachusetts Institute of Technology is described on the world wide web at:

http://wearables.www.media.mit.edu/ojects/wearables/augmented-reality.html)

In this project, three LEDs (light emitting diodes) are placed, with known distances between them, on an object. Using a camera of known focal length the position and orientation of a plane containing the LEDs is then determined. One limitation of this method is that the face of the plane with the LEDs must always be visible to the camera or viewer. Furthermore, errors in the estimation of position and orientation of the plane of the LEDs manifest as registration errors, requiring secondary means to correct.

A similar approach has been attempted by researchers at University of Southern California, based on a pose determination scheme developed by M. A. Fischler and R. C. Bolles, "Random Sample Consensus: A paradigm for model fitting with applications to image analysis and automated cartography," *Graphics and Image Processing*, 24 (6), pp. 381–395, 1981. Their method involves solving a quadratic polynomial. Ambiguities are resolved by choosing the solution closest to that in the previous frame. This approach has disadvantages similar to that of the MIT group previously discussed.

Another method, developed at Carnegie Mellon University (CMU) and denoted "magic eye," uses a robust template matching procedure to detect features. See Uenohara and Kanade, "Vision-Based Object Registration for Real-time Image Overlay," in *Proceedings $1^{st}$ International Conference on Computer Vision, Virtual Reality and Robotics in Medicine* (1995). The position and surrounding surface orientation of selected features and object coordinates is assumed to be known. A geometric invariant is used to assure proper correspondence of feature points during tracking. The invariant is also used to encode the position of graphical overlays relative to the feature points. This method requires that each graphic overlay be positioned such that there are four feature points around it in order to apply the geometric invariant method. This imposes limitations on the graphic information which is presentable.

At University of Rochester, K. Kutulakos and J. Vallino have demonstrated a system based on determining an affine coordinate system in a live video stream using markers. See K. Kutulakos and J. Vallino, "Affine object representations for Calibration-free Augmented Reality," in *Proc. IEEE Virtual Reality Annual Symposium* (1996). The graphic objects are projected in the affine coordinate system before being overlaid on a video stream. By tracking markers, the affine coordinate system is adjusted to correspond to the orientation of the object with the markers. The affine coordinates indirectly maintain registration between the real object and the graphics. This system is functional but computationally demanding.

Observer Pose Estimation Methods

Grimson et al. have developed methods to view previously imaged and reconstructed MRI and CT data superimposed on live video signals of a patient in an operating room. Grimson, W. E. L., Ettinger, G. J., White, S. J. m Lozano-Perez, T., Wells III, W. M., and Kikinis, R. "An automatic registration method for frameless stereotaxy, image guided surgery, and enhanced reality visualization," In *IEEE Transactions on Medical Imaging,* Vol. 15, no. 2, pp. 129–140 (1996). The registration is based on least squares minimization of distance between the image data and 3-D model, with the 3-D model data obtained by scanning with a laser range finder. The pose of the camera is determined from this minimization procedure. This method is computationally very demanding and also requires extensive hardware (laser range finder and marker projectors) for the data acquisition.

Another approach has been to track the position and orientation of the observer's head using active tracking devices, for example with a magnetic field based tracking device and/or an ultrasound based device. e.g., Webster, Anthony; Feiner, Steven; MacIntyre, Blair; Massie, William; and Krueger, Theodore, "Augmented Reality in architectural construction, inspection, and renovation," in *Computing in Civil Engineering,* pp. 913–919 (1996). The visual display is then continuously modified using the active tracking information to give the impression that the two-dimensional visual display is overlaid on the three-dimensional environment. The use of magnetic and/or ultrasonic tracking devices constrains the user to a limited area of mobility and is subject to distortions.

In a similar approach at the University of North Carolina at Chapel Hill, AR researchers developed a system for displaying ultrasound images directly on the image of the patient. The registration technique is based on simultaneous tracking of the user's head using magnetic sensors and the earth's magnetic field in combination with stereo cameras. Concentric colored circles are used as features for the visual tracking. Three feature points are required to determine the head pose, by stereo triangulation of the three feature points. In the absence of at least three visual features, however, the magnetic tracking contributes more to the pose estimation. When sufficient visual features are available, accuracy increases.

Hoff et al. at the Colorado School of Mines have developed another observer pose determination method based on concentric circle markers. See Hoff, W. A.; Lyon, T. and Nguyen,K., "Computer Vision-Based Registration Techniques for Augmented Reality," *Proc. of Intelligent Robots and Computer Vision XV,* Vol. 2904, in *Intelligent Systems and Advanced Manufacturing,* SPIE, Boston, Mass., pp. 538–548 (1996). By processing a video image of the object with the markers they isolate the markers. They then use an estimation algorithm to estimate the pose of the camera.

Koller et al. at California Institute of Technology in Pasadena have also demonstrated a camera-motion estimation based approach. Using a linear acceleration model for the camera motion, they use Kalman filtering techniques to perform predictive tracking of rectangular markers and determine the motion of the camera. This method is somewhat computationally demanding, which limits the speed of operation. See Koller, D., Klinker, G.; Rose, E; Breen, D.; Whitaker, R.; and Tuceryan, M., "Real-time Vision Based Camera Tracking for Augmented Reality Applications," *Proceedings of the ACM Symposium on Virtual Reality Software and Technology,* pp. 87–94 (1997).

These and other methods have all attempted to solve the registration problem in AR. However, to date all the previous methods have been in various degrees limited by the computational speed available or the need for cumbersome position and/or orientation sensors.

SUMMARY OF THE INVENTION

The invention is an apparatus and method for visually displaying computer graphics in combination with imagery of real objects, while maintaining the appearance of alignment between the graphics and the real object notwithstanding any motions of the imaging device relative to the object.

The apparent registration between the object and the computer graphic imagery is maintained by tracking automatically recognizable features on the object, according to a "visual servoing" method. This method uses a control loop to reduce disparities between feature positions on a real image frame and corresponding feature positions on a CAD representation of the object, by projecting the CAD representation onto a "virtual camera" and changing the virtual camera's assumed position and/or orientation to track the motion of the real imaging device (relative to the object).

In an alternate embodiment of the invention, an "image processing host" and one or more "display hosts" communicate over a channel with limited bandwidth. The "image processing host" handles computationally demanding image processing operations, while the "display host(s)" display computer generated graphics in registration with imagery of a real object. The method of the invention allows the transmission of registered graphics through a channel with bandwidth which would not otherwise allow transmission of the registered imagery, by encoding and transmitting concise information usable by the display host for visual servoing. The display host or hosts are thus able to render and display an appropriate view of a three-dimensional CAD object in registration with a video feed or other real object imagery, while conserving bandwidth.

DETAILED DESCRIPTION OF THE INVENTION

Figure 1:
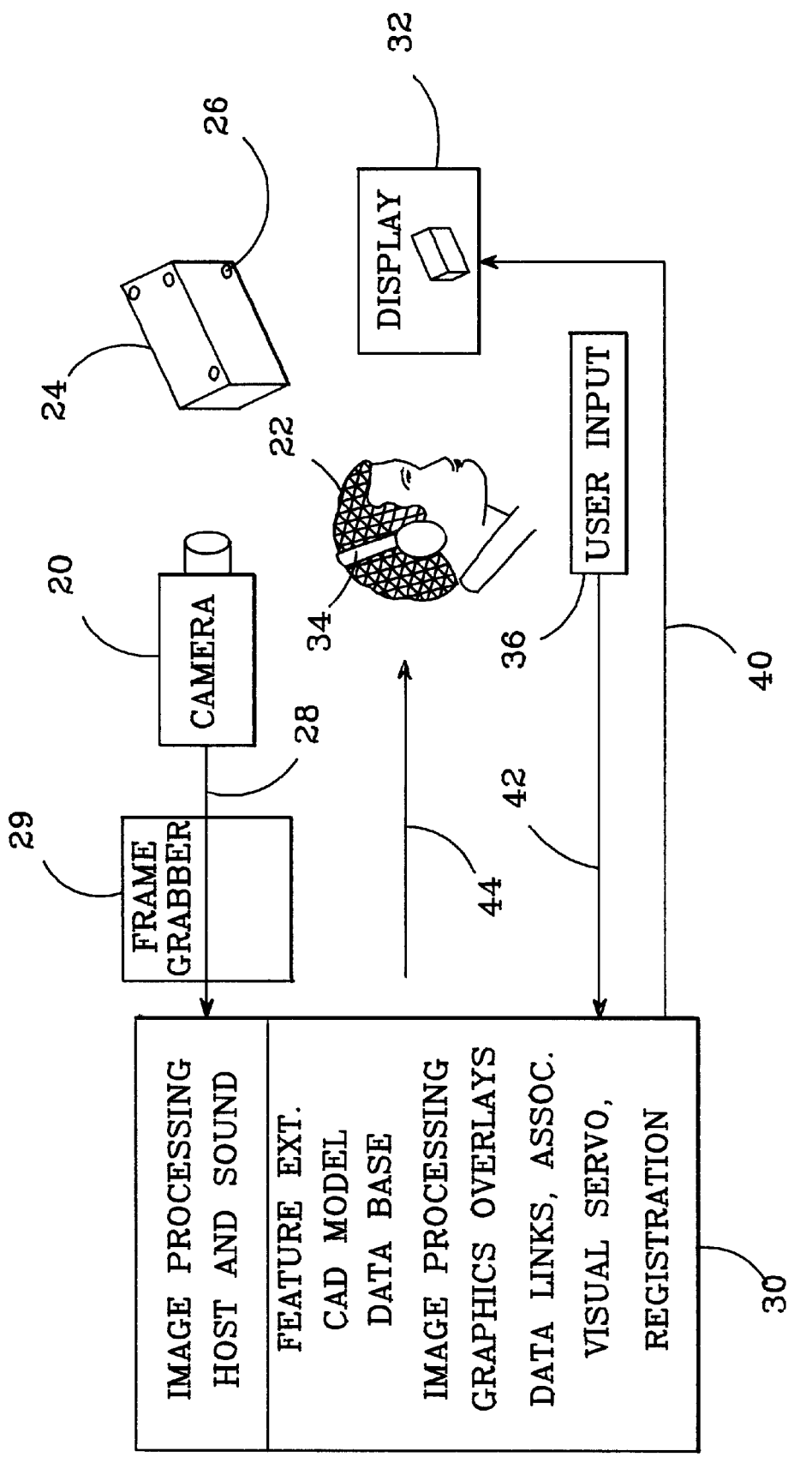
FIG. 1 is a system-level schematic diagram showing the apparatus of the invention in its typical relationship to its environment and user.

A typical embodiment of the invention is shown with a example subject in FIG. 1. A camera or other imaging device 20 (which may conveniently be head-mounted on a user 22) views an object of interest 24. The object of interest 24 is preferably marked with fiducial markers 26 (either artificial or natural recognizable features could be used). The camera 20 produces video signals 28 which are digitized by a frame grabber 29 to produce a digitized image. The digitized image is received by the image processing host 30, which is suitably a general purpose computer such as a Pentium Pro (Pentium is a registered trademark of the Intel Corporation). Although any of a variety of computers could be used, a 32 bit computer with at least 200 megahertz processor speed is preferred, with adequate RAM for image processing (at least 64 Megabytes preferred). The image processing host 30 performs feature extraction and matching to a preprogrammed CAD model of the object 24 (which may include internal structures which are not visible to the camera). The image processing host 30 also preferably includes data storage such as a disk drive for storing visual and textual records pertaining to the object 24. The image processing host 30 also performs a novel three dimensional image registration method, processes the video and graphics overlays, and outputs the combined visual display to a display device 32 for viewing by the user 22. Optionally, the user may also be equipped with an audio output device such as headphones 34 and a user input device 36 which may be, for example, a voice input device utilizing speech recognition. Alternatively, a keyboard, a graphic user interface device (such as a "mouse") or any other user input device could be used.

Figure 2:
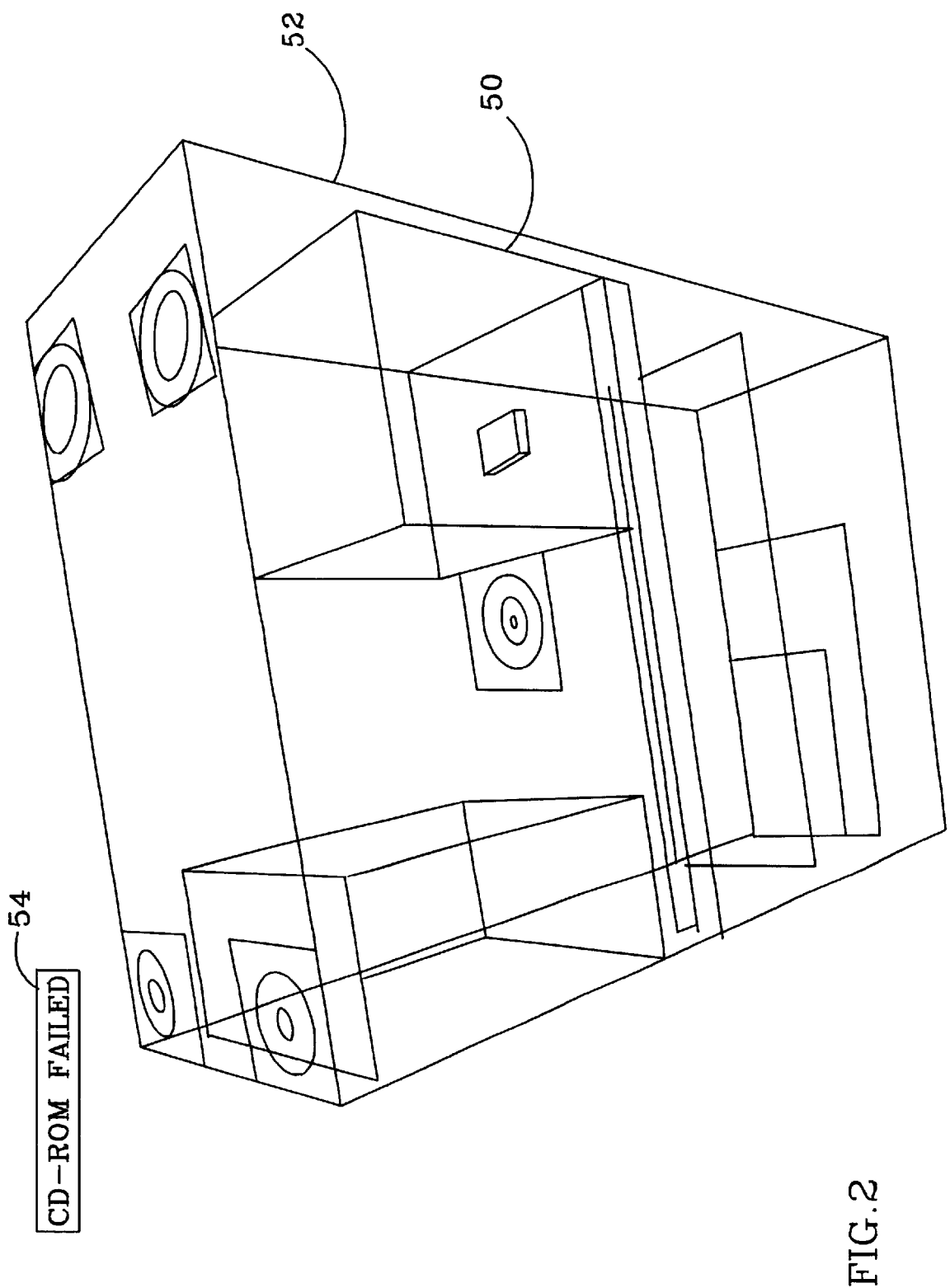
FIG. 2 is rendering of an exemplary visual display produced by the invention for user viewing.

For a more specific explanation of the context and environment of the invention, it is useful to consider a concrete application. One example would be the use of augmented reality by a technician servicing a personal computer. In concrete terms, FIG. 1 would represent a technician 22 wearing a camera 20, which views a personal computer (object 24). The image processing host 30 processes the imagery of the personal computer and combines it with a graphical CAD model wire frame outline locating the internal components of the personal computer. A wire frame graphic display is generated and registered by a novel method with the video of the image processing host 30. The combined display, properly registered, is displayed on a visual display 32 which might be a hand held display unit, a helmet mounted visor projection unit, or any other graphical display. Preferably, the display is wirelessly linked to the image processor by wireless channel 40. Thus unencumbered by cables, the technician is free to change position with respect to the object 24, and the graphic display will remain registered. The technician might choose to enter input via user input device 36. For example, if the user input device 36 is a microphone with appropriate speech recognition hardware and software, the user might enter the instruction "Show me the CD ROM drive". In response, the image processing host 30 would then highlight graphically the wire frame outline of the CD ROM drive in the display 32. Optionally, the user input device 36 is also linked by a wireless data link 42 with the image processor host. Audio information optionally may be transmitted to the technician via a wired or wireless link 44. The visual display produced in this example application is shown in FIG. 2: a wire frame outline 50 is superimposed on the image of a personal computer 52, along with text information 54, which in this example indicates a problem with a CD ROM drive for the user.

Figure 3:
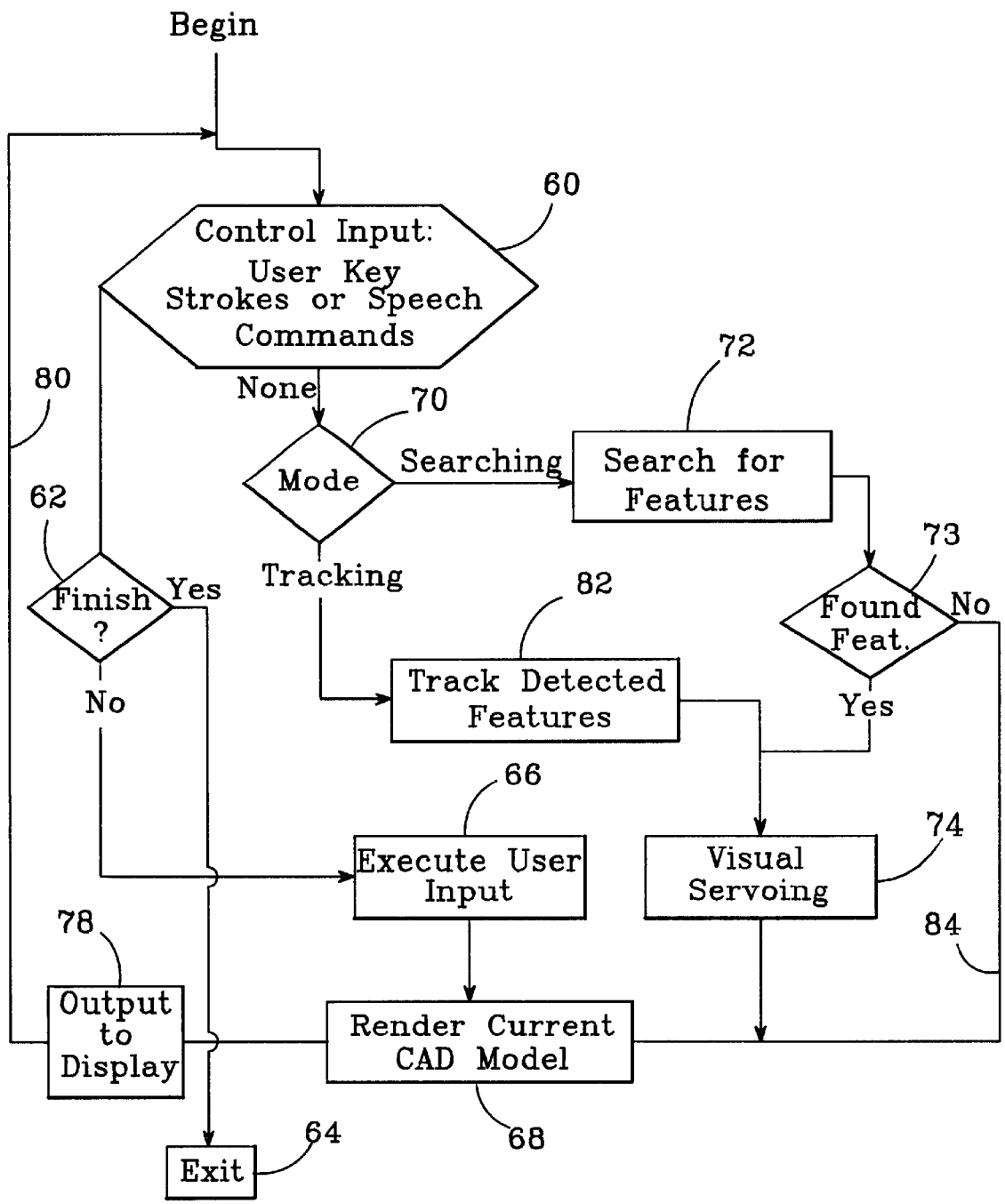
FIG. 3 is a summary flow diagram of a procedure which is preferably used by the image processing host (shown in FIG. 1) to process video and computer generated graphic information.

FIG. 3 shows a high level flow of a procedure which is preferably used by three dimensional processing host 30 to process video and CAD graphic information. This diagram as a whole constitutes a main loop of program execution. The flow illustrated presupposes that two sources of information are available to the computer: (1) time-sequenced, digitized video frames of an object of interest, and (2) a stored, three-dimensional CAD model which is associated with the object of interest.

In some applications the digitized video frames may advantageously be image-processed by conventional techniques such as thresholding, contrast enhancement, and other techniques to aid with feature recognition.

The CAD model includes structural and geometric details associated with (expected) object which is being viewed, stored in a three-dimensional format which can be rotated to properly register with the video frames. Supplemental information such as text and color coding may optionally also be included.

Given the video and CAD information, the main program loop shown in FIG. 3 operates as follows: first the program checks (step 60) for user input such as user key strokes or voice commands. If user input is detected, the program makes a decision (step 62) to either exit (step 64) if the command is to terminate, or else executes the command (step 66) if the command is other than to terminate. In general, other commands involve manipulating some aspect of a current CAD model (step 68). For example, a textual note such as "CD ROM ok" might be added to a 3-D rendering of a personal computer tower.

If no user commands are required to be executed, the program decides (decision box 70) whether it has detected trackable features (and is thus in "tracking" mode) or has yet to detect such features (and is therefore in "searching" mode). If "searching" mode is detected, the program searches the current image globally (step 72) for recognizable image features (in a typical application, ring shaped markers). If a sufficient number of such features (typically 4 or more) are detected and recognized, the program branches at decision 73, and executes a visual servoing module 74 which tracks the identified features by a method more particularly described below in connection with FIG. 9. Briefly stated, this module rotates and translates the position of a hypothetical "virtual camera" to register the predicted positions of recorded features in the CAD model with the corresponding identified positions of the features in the video frame. The method then renders (step 76) a projection of the current (3-D) CAD model, based on the parameters currently calculated by the visual servoing module 74, and outputs the current rendering (step 78), preferably fused with the video image and associated text information, for visual display. The loop then returns to the start via return branch 80, to reiterate the above described steps in a main loop.

After the initial iteration of the main loop, if all expected features (often markers) are identified in the image, the searching is preferably done in a tracking mode (step 82) which searches for each feature locally in the area where it was last detected and updates each feature's location. The tracking mode improves searching speed. When the features are tracked and their positions updated, the program proceeds to the visual servoing module 74 and the loop proceeds as previously described. In any frame where an insufficient number of features are detected for positive tracking, the visual servoing module 74 is skipped via bypass pathway 84, but the CAD model is rendered (step 68) as previously discussed and the program loops back to step 60 as shown. At least 4 non-coplanar features are generally required for unequivocal determination of camera motion. If in a particular view fewer than this minimum are detected, while continuing to search the image, it may happen that the observer moves to a better vantage point, which allows recognition of more features. When this occurs, the program will again find features and lock into a tracking loop.

Details of specific software modules or steps are described below. The unconventional methods employed for the search for features (step 72) and for the visual servoing module (step 74) are explained with particular detail.

Feature Recognition

The invention preferably uses visible fiducial markers which have been placed on the viewed object in locations with known correspondence to the CAD model of the object. To facilitate registration, the fiducial markers should be clearly detectable even in a cluttered environment, clearly distinguishable from each other, uniquely identifiable. Most preferably, they should have these characteristics even when viewed from a wide range of angles. In one embodiment of the invention, a distinctive pattern of circular fiducial markers is used. Similar (but not identical) markers have also been used previously by U. Neumann and Y. Cho, "A Self-Tracking Augmented Reality System," *Proceedings of the ACM Symposium on Virtual Reality Software and Technology,* pp. 109–115 (1996) and by Hoff, discussed above in the discussion of the background of the invention.

Figure 4:
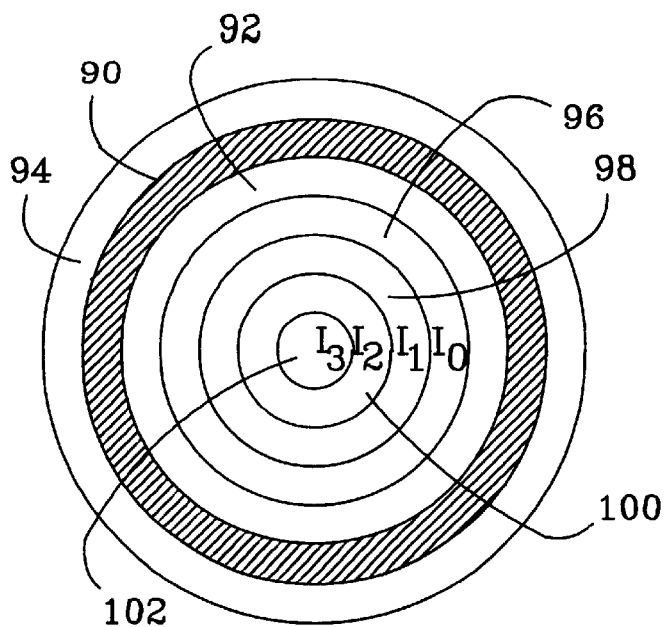
FIG. 4 is a template of a marking scheme for fiducial markers which are suitable for marking any object which is a subject of the invention.

FIG. 4 shows the marking scheme. The fiducial markers are identified by their outer black ring 90. The total width of this ring should preferably be a predetermined width relative to the diameter of the ring. It is most preferable that the outer ring 90 be bordered on the inside by a white ring 92 and on the outside by another white ring 94 in order to provide the highest possible contrast. The inner fields 96, 98, 100 and 102 provide space for a pattern of rings which is interpreted as a binary code for a marker identification number. In one scheme, a black ring indicates a 1 while a white ring indicates a 0. The marker ID can be calculated for example according to the equation:

$$ID = \sum_j i_j \cdot 2^j$$

where i is the value of the ring corresponding to index j and takes the value 1 if dark, 0 if light (in one suitable scheme). Additional possibilities for coding could be obtained by using colored ring markers.

Figure 5A:
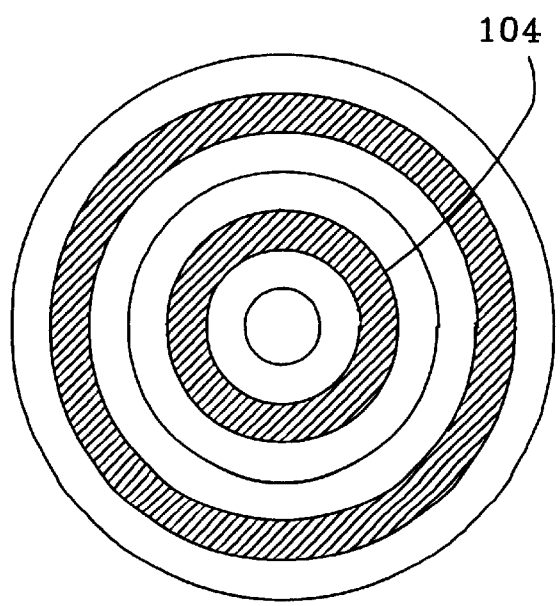
FIG. 5a is an example of a specific marker made according to the scheme of FIG. 4.

This concentric ring marking scheme has the advantage of being scale invariant (at least within the boundaries given by camera field of view and pixel resolution). The diameter of the outer ring provides a norm for reading out the inner marker pattern. When seen from an arbitrary viewing angle, the circular ring pattern is seen as a concentric ellipse pattern. FIG. 5a shows a marker encoded with the ID number 2 which can be read by noting that the $i_2$ concentric ring 104 is set to a 1 by coloring it black.

Figure 5B:
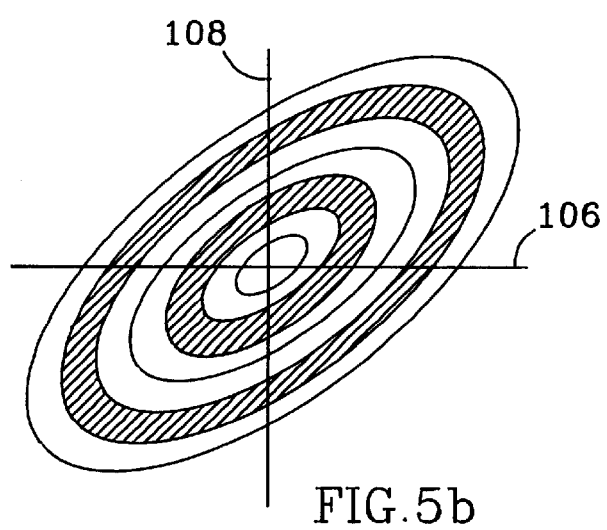
FIG. 5b is a perspective view of the marker of FIG. 5a, as seen from an oblique angle.

FIG. 5b shows an example of the same ring marker pattern as in FIG. 5a, as seen from an oblique angle by a camera. Horizontal and vertical scan lines 106 and 108 intersect at the center of the ellipsoidal structure.

Figure 6:
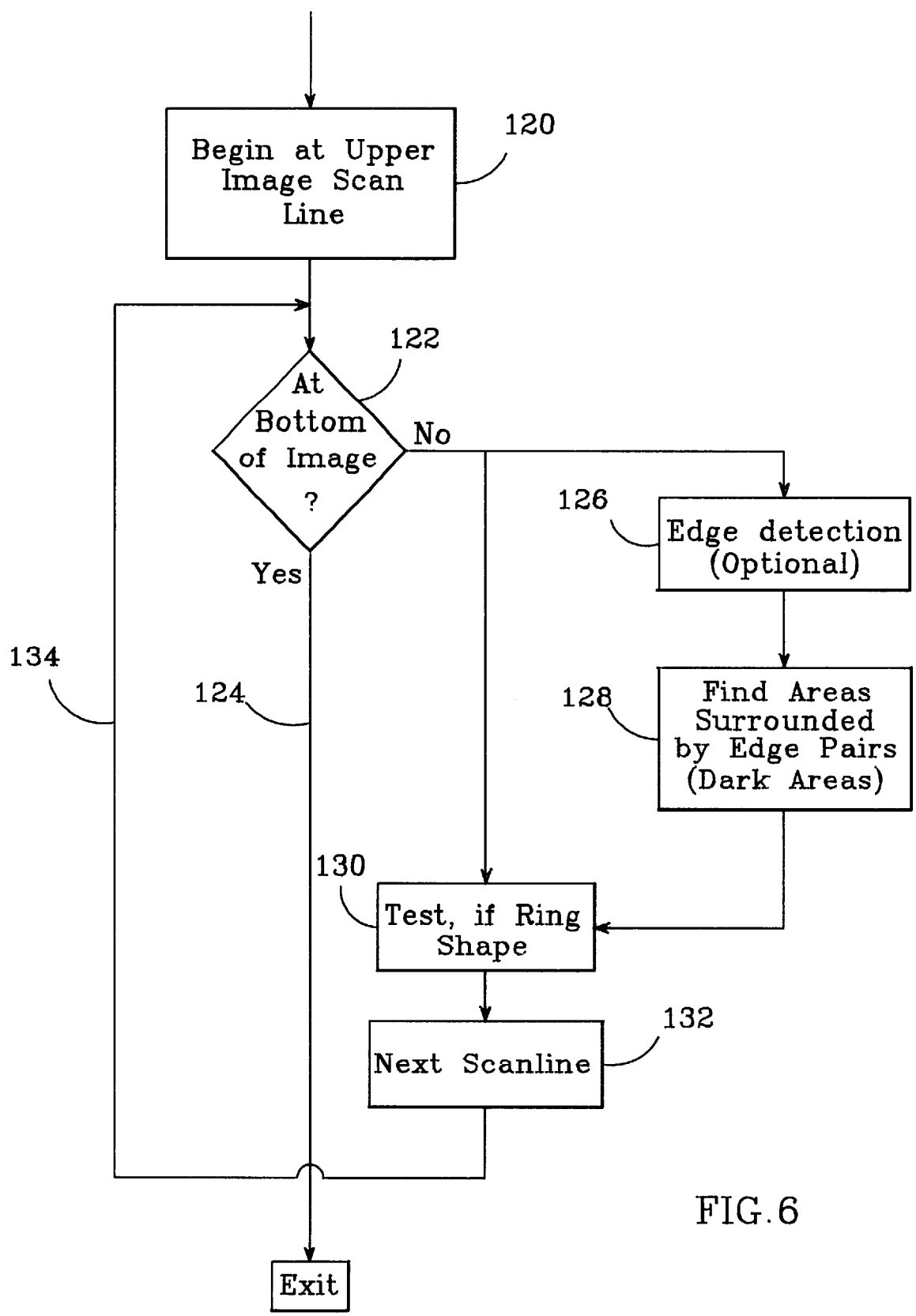
FIG. 6 is a flow diagram of a method preferably used by the image processing host (of FIG. 1) to perform the feature search step of the method shown in FIG. 3.

The search for features (step 72 of FIG. 3) is preferably executed by the method shown in FIG. 6. On search initiation, the method starts at the top of the image (step 120). A branch decision 122 tests for the bottom of the image and exits via pathway 124 when the bottom is reached. Until the bottom is reached, the program tests for ring shaped regions by a three step process. First, an edge detection operator (for example, a Sobel operator) is applied on a horizontal scan path (step 126). A pattern of vertical edge candidates is then grouped into dark and bright regions, separated by edges; and the dark regions are then tested to determine whether they can be grouped into pairs of matching ring elements (step 128). Specifically, the width of the ring candidates are tested to determine whether they lie in a certain ratio to the diameter of the ring. Dark areas which pass the width ratio criteria are selected as ring candidates. These ring candidates are preferably further tested by a vertical scan. An edge detection operator such as a sobel operator is again used to detect the vertical ring structure, which is then tested for the same diameter/width ratio.

Next, ring candidates which pass both previous tests are again tested by an edge following algorithm which follows the outer edge of the outermost black ring (step 130). Constraints regarding the enclosed area can advantageously be applied to eliminate false marker detection. The use of a simple edge following algorithm is advantageous in that computing requirements increase linearly with the diameter d of the ring. If a two-dimensional template matching approach such as 2-D cross-correlation were used instead, the computing cost would increase with $d^2$. If the ring following algorithm comes back to its starting point in a closed contour, the ellipsoidal ring marker is confirmed as such. The boundaries of the ellipsoid are now known and the ring pattern can be read on both a horizontal and vertical scan through the ellipse center. Scanning these two search paths provides a four fold redundancy for the evaluation of the bit pattern and reduce pixel quantization errors for small markers. Preferably, after the marker has been detected, a check is performed to determine whether it has already been detected on another search path in order to avoid multiple detection of the same marker. It has been found that by searching through a image of 640×480 pixels multiple ring markers are detected and identified reliably by the above method requiring approximately 0.4 seconds search time on a 200 megahertz Pentium Pro processor.

Once the outer ring of the marker has been identified, the center of the ring marker is approximately located by taking the upper extreme, the lower extreme, the left extreme, and the right extreme of the field and averaging to locate the center.

When a horizontal scanline has been processed, the next (lower) scanline is selected (step 132) and the process repeated by looping back via return path 134 to step 122, until the complete image has been searched. After the centers of all the detectable markers are identified and associated with the marker ID, these data are summarized and passed to the visual servoing module 30.

Visual Servoing Module

The visual servoing module 30 registers the apparent projected positions of the fiducial markers with predicted projected positions of the markers according to a three-dimensional CAD model as it would be viewed by a hypothetical, virtual camera with an assumed position and orientation. The actual camera position and orientation is not directly "known" by (accessible to) the module, except as a current best estimate. The virtual camera's position and orientation are varied to reduce the error between the estimated marker positions and the measured positions extracted from the video signal.

This method is similar to the method of visual servoing used for controlling robotic systems, except that in the invention feedback is not used to move an actual camera; rather, a virtual camera is "moved" to reduce the error between the video and the calculated projection of the CAD model as viewed by the virtual camera.

Figure 7:
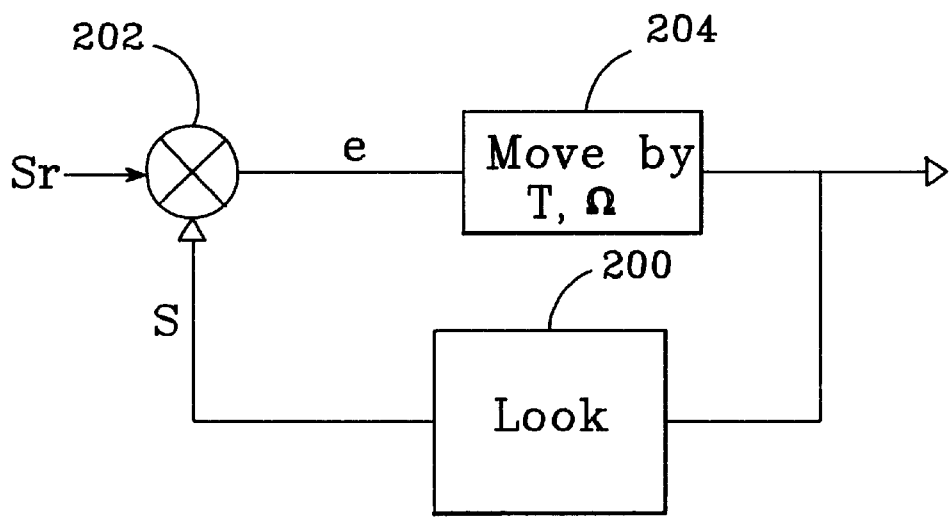
FIG. 7 is an abstract diagram of a generalized control loop, to illustrate the mathematical derivation of the overall method embodied in the main loop of FIG. 1.

The visual servoing method is most clearly explained first in the abstract, in connection with a closed loop as shown in FIG. 7. This loop represents a simplified abstraction of the "main loop" of FIG. 1. The input $S_r$ includes the identities and respective projected positions of all the markers detected in the video frame. (The actual three dimensional coordinates of the marker centers is not measured.) The input S is a set of system states derived from a hypothetical set of marker locations on a stored, three-dimensional CAD model of the viewed object. These system states are derived by extracting from a database the three-dimensional locations of the markers attached in a predetermined pattern and then projecting these locations onto an image plane of an assumed "virtual camera", based on an initial assumed position of the virtual camera. The "look" module 200 computes the projection of the marker centers onto the plane of the assumed virtual camera. The $S_r$ states and the S states are compared by an error comparison of module 202 to produce an error signal e (a vector). Based on the error function e, the "move" module 204 moves the assumed position of the virtual camera in a direction calculated to reduce e (preferably calculated by the equations given below). Based on the new, moved position of the virtual camera, the look module 200 again projects a new projection of the three-dimensional marker locations onto a assumed two-dimensional virtual camera frame and the process is repeated in the close loop as shown. By properly defining the error function and a useful "move" algorithm, the process can be made to converge or track the motion of the real object, thereby producing a series of projections of the CAD model as seen from the virtual camera's viewpoint which correspond well with the video view of the corresponding real object.

A suitable "move" algorithm is mathematically derived as follows: For best tracking, it is desired to minimize the error function, e. To do so, we require an analytical relationship between the motion of the virtual camera and the resulting state S (which denotes the projected positions of the virtual markers on the graphical CAD model of the object, as seen from the virtual camera's viewpoint).

Figure 8:
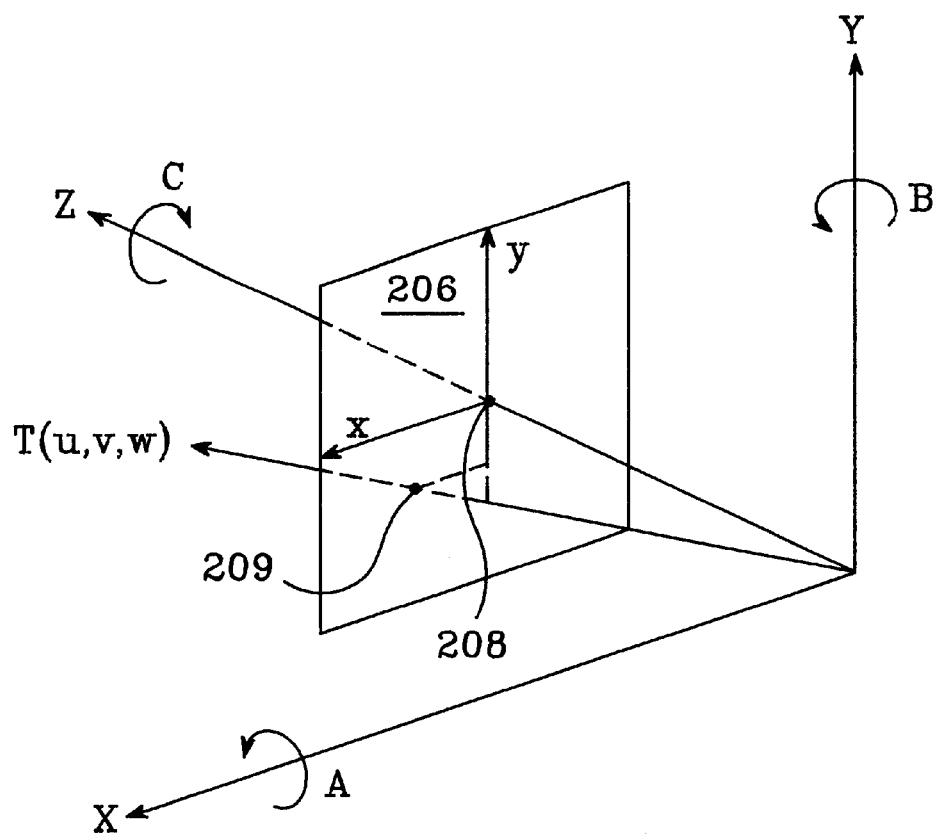
FIG. 8 is a perspective view of the coordinate systems employed in the mathematical derivation of a visual servoing method.

For convenience, we define the virtual camera motions in terms of dual standard coordinate systems as shown in FIG. 8. The plane 206 represents a plane of image projection, having coordinates x,y. The X,Y,Z system represents an independent or "world" coordinate system. The Z axis intersects the plane 206 at its origin 208 (x=y=0). We define a pinhole projection as a mapping which maps every vector T (having components U,V,W) onto a point in the plane 206, where that point is the intersection of the vector T (with origin at the origin of the world system) and the plane 206. One such point 209 is shown. The intersection of the vector T with the projection plane 206 is denoted by the point 209, with coordinates defined as $x_p, y_p$. This corresponds to a pinhole projection of rays onto the plane 206, where the pinhole is located at the origin of the world coordinate system, and the origin of the rays is opposite the vector T on a line through the origin. A rotational velocity component of the camera motion is defined as $\Omega$ with components A,B,C. We then define the error function, $$e = S - S_r$$

To assure registration, it is desired to minimize the absolute value of e. The change in the error function is then given by:

$$\dot{e} = \dot{s} \times$$

To find a solution that tracks gracefully, we assume that the error function decays exponentially, so that $$\dot{e} = -\lambda \cdot e$$

where $\lambda$ (the constant in the exponential, controls the decay rate (i.e. speed of convergence). Therefore, $$\dot{s} = -\lambda \cdot (s - s_r)$$

from standard optic flow equations (see Horn, *Robot Vision*, (Cambridge, 1987) we can write the two dimensional displacement of an image feature projected on the image plane at $(x_p, y_p)$ as $$\dot{x}_p = \frac{1}{Z(x_p, y_p)}[-U + x_p W] + A x_p y_p - B[1 + x_p^2] + C y_p$$

$$\dot{y}_p = \frac{1}{Z(x_p, y_p)}[-V + y_p W] + A[1 + y_p^2] - B x_p y_p - C x_p$$

The relationship between the change in the two-dimensional projection of a point and the motion parameters is of the form:

$$\dot{s} = L \begin{pmatrix} T \\ \Omega \end{pmatrix}$$

where L is the interaction matrix whose columns represent simple functions of the two dimensional coordinates at $x_p$, $y_p$, and the depth Z of the three dimensional point projected at $x_p, y_p$; and each pair of rows of L represents the entries for a specific identified feature (marker). L thus has 6 columns and a number of rows equal to twice the number of distinct features included in the calculations. T is the translation vector and $\Omega$ is the rotational vector. We would like to determine T and $\Omega$. Assuming that the motion of features S is due to the motion T and $\Omega$, we obtain:

$$L \begin{pmatrix} T \\ \Omega \end{pmatrix} = -\lambda e$$

By inverting the equation, we get the control law $$\begin{pmatrix} T \\ \Omega \end{pmatrix} = -\lambda L^+ e$$

where $L^+$ is the pseudo-inverse of L.

These equations allow computation of the motion of the virtual camera which is required to minimize the error e. When the operations are performed for a sufficient number of iterations in a closed loop, the value S will reach $S_r$ when e is reduced to 0.

Figure 9:
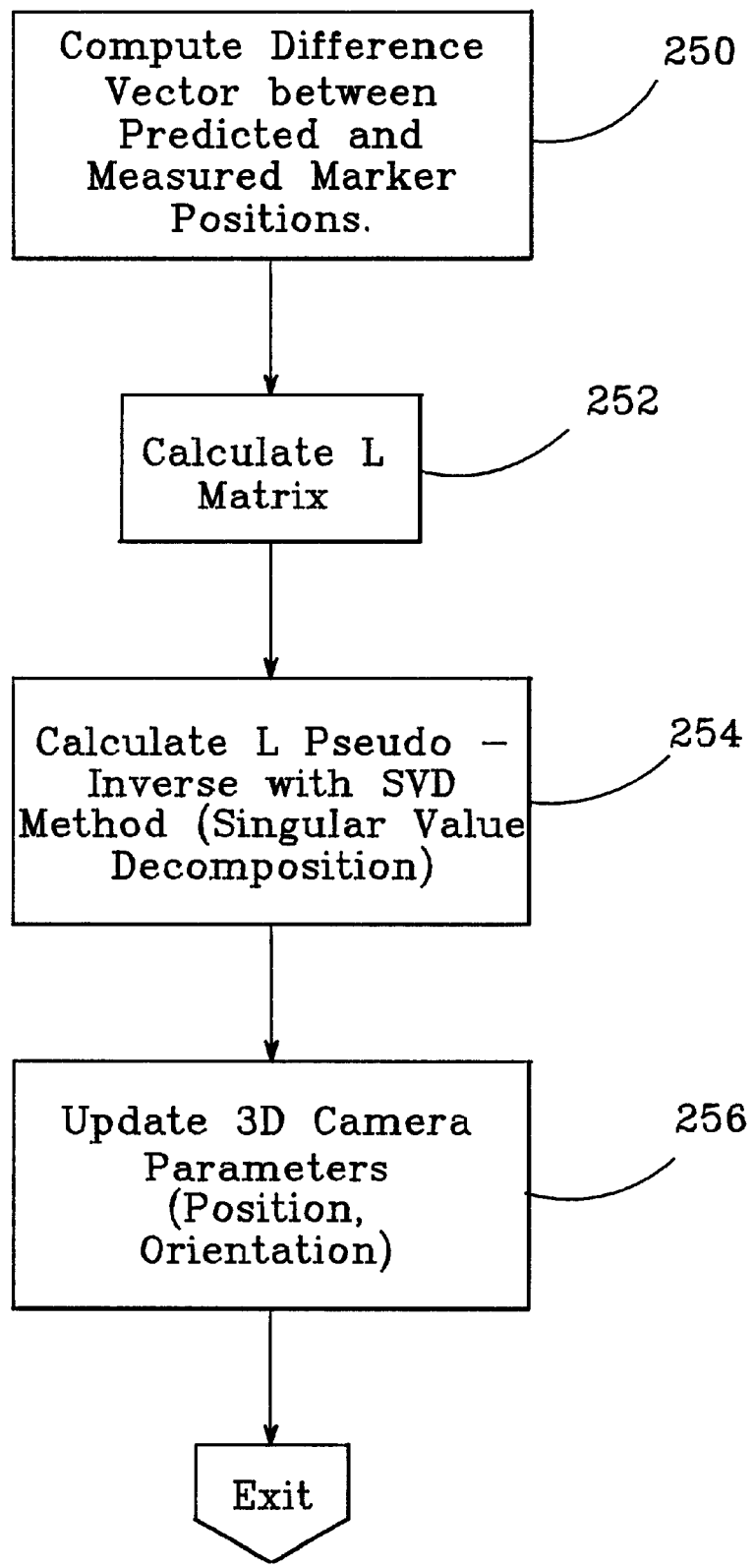
FIG. 9 is a flow diagram of the details of the "visual servoing" module of FIG. 3.

Details of a method preferably used by the visual servoing module 30 (of FIG. 1) are shown in FIG. 9. First, the difference vector e is calculated from the difference of the coordinate values of the predicted and measured feature positions (step 250). The predicted feature positions are recorded in association with the CAD model, while the measured feature positions would typically be the marker locations extracted suitably by the methods described above in connection with FIG. 6. Next the L matrix is calculated from the currently estimated marker positions $x_p$, $y_p$, and z (two rows for each marker, step 252). The pseudoinverse of the matrix L is then calculated, preferably by the method of singular value decomposition (step 254). The translation and rotation matrices T and Ω are then calculated from the equations previously given, and used to update the position and orientation parameters of the "virtual camera", thereby rotating and shifting the "virtual camera" point-of-view (step 256).

Figure 10:
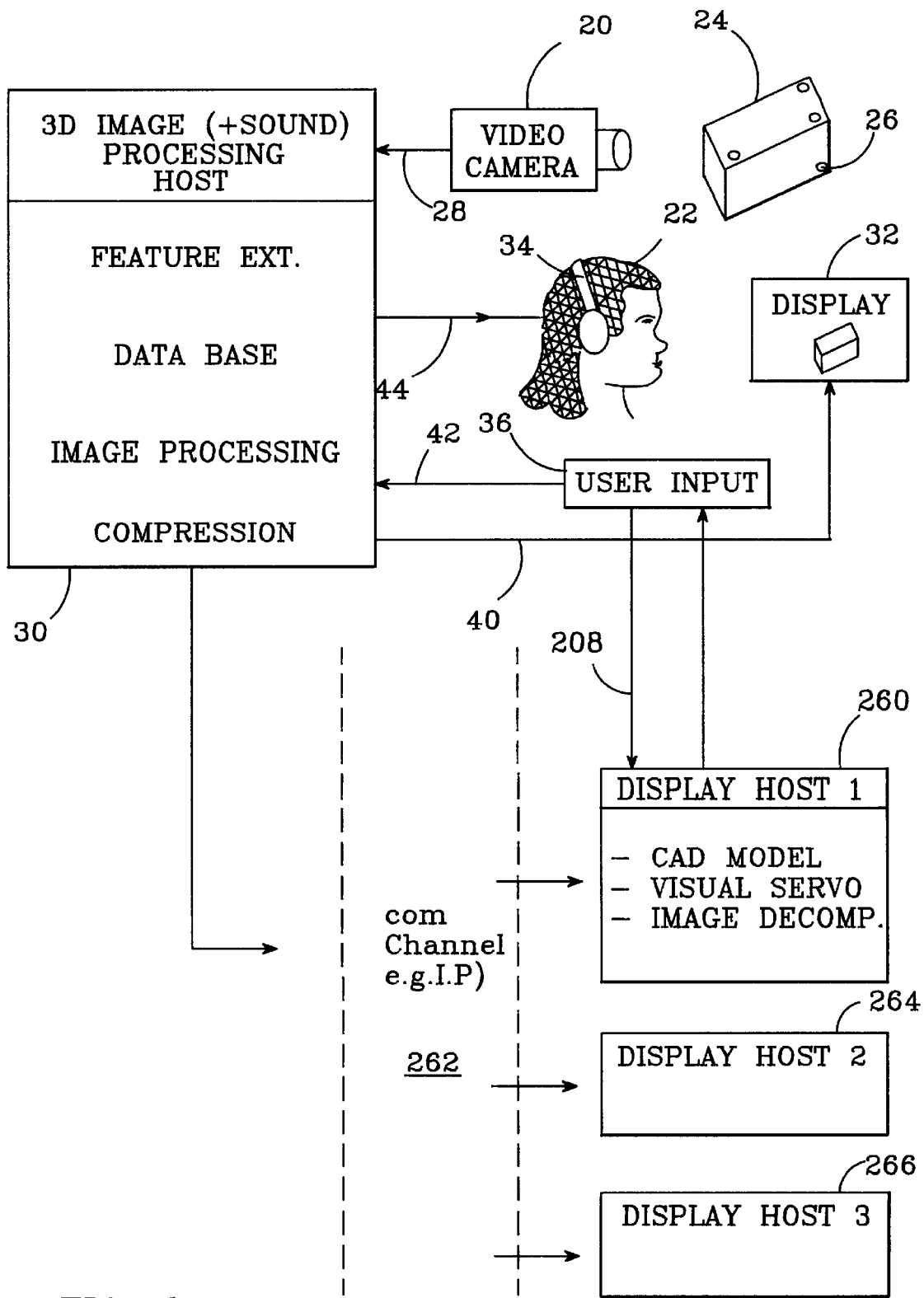
FIG. 10 is a system-level schematic diagram of an alternate embodiment of the invention which includes a communication channel and one or more "display hosts".

FIG. 10 shows an alternate embodiment of the invention which is well suited for use in association with a communication channel of limited band width, for example in a distributed computing system using a network protocol such as Internet Protocol (IP). This embodiment of the invention is advantageous in such environments specifically because computing tasks are divided between a 2-D image processing host and a 3-D display host 260, which performs the visual servoing computations.

In this embodiment, the video camera 20 views an object 24 marked with fiducial markers 26. The video signal 28 is communicated to a 2-D image processing host, which may be a general purpose computer as described in connection with the embodiment of FIG. 1. The image processing host 30 performs feature extraction and image processing functions as described in connection with the embodiment of FIG. 1. However, in contrast to the previously described embodiment, in this embodiment the visual servoing and the comparison of the imagery with the CAD model is the responsibility of at least one separate display host 260, which may suitably be a portable computer such as a hand held notebook computer. The image processing host extracts the locations of the features (typically markers) from the video feed 28 and encodes the marker identities along with each marker's location on the two dimensional plane of projection of the video camera 20. This information is sufficiently succinct to be transmitted along with preferably compressed image two dimensional image data through a communication channel 262 of limited band width, for example an internet protocol data channel either wired or wireless. The low bandwidth information is then received by the first display host 260. The display host 260 decompresses the image and sends it to display 32. It also receives the two-dimensional projection locations of the markers, compares them with the projection of a preprogrammed CAD model, and applies the method of visual servoing as previously discussed in connection with FIGS. 3 and 9 to register the projection of the CAD model with the known projections of the fiducial markers. In this way the display host finds the position of a virtual camera which best registers the graphic CAD model with the video feed and displays the superposition of both sets of information on display 32 for the user 22 to view. Other display hosts such as second display host 264 can optionally also receive information from the image processing host 30 through communication channel 262 for simultaneous display on other visual displays such as a second display 264 and a third display 266. This allows remote monitoring of the processes being viewed by video camera 20. Such remote monitoring may be useful, for example in controlling robotic processes where it is desired to use augmented reality graphics.

Variations of this embodiment are also possible. For example, instead of transmitting the extracted marker positions from the image processing host to the display host, a visual servoing method could be executed by the image processing host and the position and the orientation of the virtual camera could be transmitted through the communication channel to the display host(s). In certain applications, it may not be necessary to communicate the complete video signal. For example, with a see-through helmet display a viewer can see the real visual components through the helmet. In such a case only the tracking information need be transmitted through the communication channel. Additional available bandwidth could be exploited to download CAD information (original or updated) to the display host or hosts.

The embodiment of FIG. 10 makes efficient use of limited bandwidth communication channels because it allows a viewer with a portable display to view apparently three-dimensional graphics in real time while the communication channel need only be adequate for the transmission of highly compressed two-dimensional images. As is well known, uncompressed two-dimensional image data sets often require the transmission of vastly larger data files and therefore larger bandwidth communication channels. An additional advantage is that the most demanding computational tasks (image processing) are not required to be performed by the portable, user-held display host; instead they are performed remotely by the image processing host. This allows the use of smaller hardware for the portable display host. In addition, to promote the mobility of the user, the video camera signal 28 may be transmitted over a wireless channel much like a TV broadcast.

The specific method preferably used by the image processing host in this alternate embodiment is the same method diagramed above in FIGS. 3 and 6 and previously explained in connection with those figures. Similarly, the visual servoing method preferably employed by the display host(s) 262 and (optionally) 264 are the same methods diagrammed in FIG. 9 above and discussed in connection with that figure. CAD models of expected objects are preferably previously loaded into the portable display hosts to minimize the amount of data which must be transmitted from the image processing host. Alternatively, the CAD models could be transmitted, in a compressed form through the communication channel at the expense of visual processing speed.

As in the embodiment previously described in connection with FIG. 1, audio signals are optionally provided through a audio communication channel 44 for production on a transducer such as headphones 34. Such enhancements in many cases increase the sense of reality and the ability to communicate information to the user 22. A user input device such as a microphone 36 can also optionally be added to allow communication from the user through channel 42 with the image processing host and the display host 260.

In some applications, the user 22 might be at a location removed from the location of the video camera 20 and the object 24. For example, in one possible application, video camera 20 could be mounted on a robot which is under telemetric control to inspect an object 24 in a environment hostile to human users. A human user 22, safely removed from the hostile environment, then views the scene from the vantage point of the robot on display 32, while other users monitor the progress on other display hosts such as 264 and secondary displays such as 266. Such an arrangement might also be used for example to teach skills such as surgery or mechanical repair by allowing multiple student viewers to view augmented reality displays at multiple display host stations, all connected by a limited bandwidth communication channel to a image processing host.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method for finding the relative position and orientation of an imaging device in relation to an imaged object, wherein said imaging device produces a video signal representing a two-dimensional projection of said imaged object onto an image frame, the method comprising the steps of:

recognizing a plurality of features from the video signal;

associating with each recognized feature a two-dimensional position in the image frame;

computing a disparity between the positions of the features and corresponding positions of features in a calculated projection of a stored, three-dimensional object model, said calculated projection calculated according to a virtual camera model; and varying parameters of the virtual camera model, consistent with a projective geometric model, to reduce said disparity;

wherein said disparity is reduced by computing and applying a transformation matrix including translation sub-matrix and rotation sub-matrix, and wherein said sub-matrices are calculated from translation and rotation sub-vectors of a vector obtained by multiplying a constant with a product of an error function and a pseudo-inverse of an interaction matrix L;

wherein said interaction matrix L represents two dimensional coordinates xp, yp and a depth Z for a plurality of pre-defined points in a calculated three dimensional object model, and said two dimensional coordinates xp, yp are calculated projected positions of said pre-defined points onto a hypothetical plane of projection which corresponds to an image plane of said virtual camera model.

2. The method of claim 1, wherein said parameters are varied by rotating said virtual camera model relative to a pre-defined coordinate system.

3. The method of claim 2, wherein said parameters are varied by translating said virtual camera model relative to a predefined coordinate system.

4. The method of claim 2, further comprising the step of:

reiteratively repeating said previously recited steps in a loop, to further reduce said disparity.

5. A method of registering a two-dimensional object image of a three-dimensional object with a stored, three-dimensional model having a predetermined spatial relationship to the three-dimensional object, comprising the steps of:

identifying the positions of a plurality of features in said object image;

rendering a virtual image by projecting at least portions of said three-dimensional model onto a virtual image plane;

calculating an error function which measures a difference between positions of said plurality of features in said object image and corresponding positions of previously associated features in said virtual image;

finding a position and/or orientation of said virtual image plane which reduces said error function, wherein said position and/or orientation are found by computing and applying a transformation matrix including a translation sub-matrix and a rotation sub-matrix, and wherein said sub-matrices are calculated from translation and rotation sub-vectors of a vector obtained by multiplying a constant with a product of an error function and a pseudo-inverse of an interaction matrix L;

wherein said interaction matrix L represents two dimensional coordinates xp, yp and a depth Z for a plurality of pre-defined points in a calculated three dimensional object model, and said two dimensional coordinates xp, yp are calculated projected positions of said pre-defined points onto the virtual image plane.

6. The method of claim 5, wherein an orientation of said virtual image plane is found by iteratively rotating said virtual image plane relative to a pre-defined coordinate system.

7. The method of claim 6, wherein said position of said virtual image plane is found by reiteratively translating said virtual image plane relative to a pre-defined coordinate system.

8. The method of claim 5, wherein said error function is represented by a vector having plural distance components, each said distance component being a distance between a feature position in the object image and a corresponding virtual feature position in said virtual image.

9. The method of claim 8, wherein said feature positions in said object image are determined by recognizing ring-shaped markers on said three dimensional object.

10. The method of claim 9, wherein said ring shaped markers are coded to identify specific markers with an associated identifier.

11. The method of claim 10, wherein said ring-shaped markers are coded according to a binary code.

12. The method of claim 9, wherein said markers are recognized by searching an image for projected bands of contrast having a predetermined ratio between their width and their diameter.

* * * * *